US008709824B2

(12) United States Patent
Rothmann et al.

(10) Patent No.: US 8,709,824 B2
(45) Date of Patent: Apr. 29, 2014

(54) CONTAMINATION BARRIER

(75) Inventors: Thomas Rothmann, Langenfeld (DE); Markus Sprenger-Haussels, Solingen (DE); Petra Benkel, Haan (DE); Sabine Hermes, Erkrath (DE); Friederike Wilmer, Essen (DE)

(73) Assignee: Qiagen GmbH, Hilden (DE)

( * ) Notice: Subject to any disclaimer, the term of this patent is extended or adjusted under 35 U.S.C. 154(b) by 1194 days.

(21) Appl. No.: 10/586,785

(22) PCT Filed: Jan. 24, 2005

(86) PCT No.: PCT/EP2005/000650

§ 371 (c)(1),
(2), (4) Date: Mar. 16, 2007

(87) PCT Pub. No.: WO2005/070545

PCT Pub. Date: Aug. 4, 2005

(65) Prior Publication Data

US 2008/0221372 A1 Sep. 11, 2008

(30) Foreign Application Priority Data

Jan. 23, 2004 (EP) .................................... 04001498

(51) Int. Cl.
*G01N 1/38* (2006.01)

(52) U.S. Cl.
USPC ............... 436/180; 422/40; 422/41; 422/500; 422/501; 422/509; 436/174; 436/176

(58) Field of Classification Search
USPC ............... 208/370; 435/4, 30, 31; 436/1, 174, 436/176, 180; 585/1, 899; 422/40, 41, 500, 422/501, 509
See application file for complete search history.

(56) References Cited

U.S. PATENT DOCUMENTS

| | | | | | |
|---|---|---|---|---|---|
| 4,121,466 | A | * | 10/1978 | Reichler et al. | 73/864.22 |
| 4,902,481 | A | | 2/1990 | Clark et al. | |
| 5,333,698 | A | * | 8/1994 | Van Slyke | 175/65 |
| 5,411,876 | A | * | 5/1995 | Bloch et al. | 435/91.2 |
| 5,518,060 | A | | 5/1996 | Cleary et al. | |
| 5,576,197 | A | * | 11/1996 | Arnold | 435/91.2 |
| 5,721,136 | A | | 2/1998 | Finney et al. | |
| 5,968,729 | A | * | 10/1999 | Kosak et al. | 435/4 |
| 2002/0086327 | A1 | * | 7/2002 | Perbost et al. | 435/6 |
| 2003/0065152 | A1 | * | 4/2003 | Rothmann et al. | 530/419 |

FOREIGN PATENT DOCUMENTS

| | | | |
|---|---|---|---|
| EP | 0 011 327 | B1 | 5/1980 |
| EP | 0 805 345 | A2 | 11/1997 |

OTHER PUBLICATIONS

J. Crocker and D. Burnett, eds, The Science of Laboratory Diagnosis, Isis Medical Media, 1998, p. 521.*
D. Doolan, ed., Malaria Methods and Protocols, Humana Press, 2002, p. 223.*

(Continued)

*Primary Examiner* — In Suk Bullock
*Assistant Examiner* — Bradley Etherton
(74) *Attorney, Agent, or Firm* — Fanelli Haag & Kilger PLLC

(57) ABSTRACT

The present invention concerns a contamination barrier 5 that permits an efficient and reproducible processing of a high number of samples with the prevention of contamination of aqueous solutions 3 in open and/or automated systems, especially in the ppm range, in that it comprises at least one water immiscible hydrocarbon compound. In addition a method for the prevention of contamination during the processing of aqueous solutions 3 in open and/or automated systems is disclosed.

9 Claims, 4 Drawing Sheets

(56) References Cited

OTHER PUBLICATIONS

Wolfmeier, et. al., "Waxes " in Ullmann's Encyclopedia of Industrial Chemistry, pblished on-line Jun. 15, 2000, Sec. 2.1 (pp. 9 and 21) and Sec. 4.2.1 (p. 25).*

Moretto, et al., "Silicones" in Ullmann's Encyclopedia of Chemical Technology, Wiley-VCH, 2002, on-line posting Jun. 15, 2000.*

Griesbaum, et al., "Hydrocarbons" in Ullmann's Encyclopedia of Industrial Chemistry, Wiley-VCH, 2002, available on-line Jun. 15, 2000.*

Kretz, et al., "Cycle Sequencing" in Genome Research, 1994, 3:S107-S114—month unknown.*

Kramer, et al., "The Polymerase Chain Reaction" in Current Protocols in Protein Science, A.4J.1-A.4J.8, John Wiley & Sons, 2002, available on-line Nov. 1, 2002.*

Dear, "Single Molecule PCR" in PCR Technology—Current Applications, CRC Press, 2003, 245-257—month uknown.*

Snounou, "Genotyping of *Plasmodium* spp.—Nested PCR" in Methods in Molecular Medicine, vol. 72: Malaria Methods and Protocols, D. L. Doolan, ed., Humana Press, 2002, pp. 103-116—month unknown.*

* cited by examiner

CONTAMINATION BARRIER

CROSS REFERENCE TO RELATED APPLICATIONS

This application is a United States national stage filing under 35 U.S.C. §371 of international (PCT) application No. PCT/EP2005/000650, filed Jan. 24, 2005 and designating the US, which claims priority to European application 04001498.7, filed Jan. 23, 2004.

FIELD OF THE INVENTION

The present invention concerns a contamination barrier as well a method for the avoidance of contamination of aqueous solutions that arise especially during transfer and/or aerosol formation, for example by pipetting on open systems.

BACKGROUND OF THE INVENTION

It is precisely in the area of biotechnology that in recent years there has been an increase in the search for automation solutions for safe and efficient processing, particularly in the case of a large number of samples that arise, for example, in HIV virus monitoring. In this connection there is increasing demand for fully automatic, high-throughput work stations, which process a very large number of samples in the shortest possible time, wherein increasingly additional manual input is dispensed with, while at the same time the smallest quantities of biological materials need to be detected.

However, the currently popular robotic systems have a fundamental problem when working with biological material, especially in the area of molecular biology and/or diagnostics. Since the samples are normally processed on a flat body (such as a rack) whereby the individual sample vessels stand open next to one another, contamination of mainly neighbouring samples occurs during processing, principally by aerosol formation, but also repeatedly through mechanical transfer of sample material.

To avoid such (cross-)contamination a number of add-on modules and/or consumables for robotic systems are disclosed in the state of the art. Thus, for example, caps or, as disclosed in the utility patent specification DE 200 06 546 U1, cover pads to protect prepared, upwardly open reaction vessels on flat bodies. This type of covering, however, only protects the samples of a rack, for example, during transport and/or during storage. However, contamination continues to occur during processing of the individual samples on the rack.

Furthermore, cross-contamination rates can only be reduced but not fully eliminated by the use of sterile consumables known from the state of the art, for example specially coated disposable pipettes and/or disposable filter tips. Thus contamination principally in the ppm range remains a fundamental problem (for example in the area of PCR diagnostics, where single molecules are detected).

Furthermore, methods are known in which, as disclosed for example in the European patent specification EP 0011327 B1, the aqueous solution incorporates water-soluble compounds to avoid aerosol formation. However, as these mix with the sample liquid and can possibly even change them or lead to undesirable side reactions their use is extremely disadvantageous and, in PCR diagnostics in particular, not conceivable.

In addition a plethora of enclosure possibilities have been developed for protection against contamination of the samples, for example covers, septa and/or filters, etc., for one or more sample vessels. However, these have disadvantages in handling especially in the area of automation since, for example, opening and closing the closures, etc., is very time consuming, and depending upon the closure system not very feasible mechanically. Besides, there is still the risk that aerosols formed in the sample vessel can escape during processing and in that way on opening the neighbouring sample vessel in the next step that sample can be contaminated with sample material.

Moreover, sample vessels with septa and/or thin filter material are not flexibly applicable in each robotic or automatic pipetting system since only a small number of pipette tips and/or pipette needles are suitable for such sample vessels.

SUMMARY OF THE INVENTION

Since no known device and/or known method is disclosed in the state of the art which could be used in a satisfactory way for the prevention of contamination, especially in the area of automatic PCR diagnosis and such a device or method cannot be derived from it the task forming the basis of the present invention is to provide efficient and reproducible processing of a high number of samples with avoidance of contamination in the solutions being analysed in open and/or automatic systems.

This task is solved according to the invention by the provision of a contamination barrier for the avoidance of contamination of aqueous solutions in open and/or automatic systems that features at least one hydrocarbon and/or hydrocarbon mixture immiscible with water. Consequently the task of the present invention is solved by the provision of a method for prevention of contamination in that for processing of aqueous solutions in open and/or automatic systems they are covered with at least one hydrocarbon or hydrocarbon mixture immiscible with water.

DETAILED DESCRIPTION OF THE INVENTION

Figure 1:
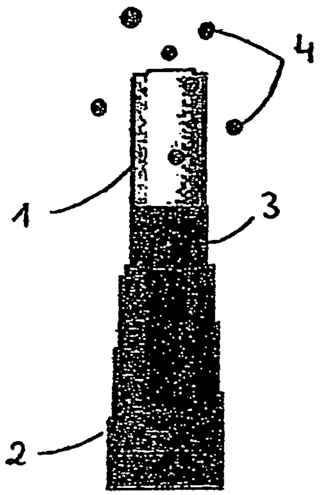
FIG. 1 the formation of aerosols from an aqueous solution with sample vessels known from the state of the art.

The contamination barrier of the invention is characterised especially by its flexible application in the most varied of sample vessels. Particularly advantageous is that the contamination barrier of the invention forms simply and rapidly even in small vessels and can be removed again. In particular an increase in time-consuming and costly, manual or even mechanical use of closures and/or septa, etc., can be dispensed with. A further advantage of the contamination barrier of the invention is its flexible introduction into the sample vessel, whereby unlike the use of septa and/or filter materials that are arranged fixedly in the sample vessel, the volume of the aqueous solution can be varied at any time without the formation of space in which contamination-causing aerosol formation occurs. Most particularly advantageous is also the use with very small volumes of aqueous solutions (e.g. in the ppm range and smaller).

Furthermore, an advantageous application of the contamination barrier of the invention is that it can be used to cover almost any aqueous solution owing to the water-immiscible hydrocarbon or hydrocarbon mixture.

In order to avoid contamination during processing, aqueous solutions in open and/or automatic systems at least one water-immiscible hydrocarbon is introduced by covering the solution to be analysed. The contamination barrier of the invention applied in such a way to the aqueous solution completely forms a film on the aqueous solution and thus hinders the penetration and the formation of aqueous aerosols. The contamination barrier of the invention advantageously comprises preferably of at least one substituted or unsubstituted, branched or unbranched hydrocarbon. In addition the contamination barrier of the invention can consist of or be formed from a cyclic, saturated or unsaturated hydrocarbon (e.g. cyclohexane, etc.) or an aromatic hydrocarbon, (e.g. benzene or toluene), wherein exclusively only such hydrocarbons are used that are immiscible with water. Also the hydrocarbons used according to the invention can carry as substituents one or more halogen atom(s), nitro group(s), and/or amino groups (s).

All aforementioned (hydrocarbon) compounds can be present alone or also as a mixture (e.g. a hydrocarbon mixture such as mineral oil).

Minerals oils within the meaning of the present invention are understood to comprise liquid distillates isolated from mineral raw materials such as, for example, crude oil, lignite oil, coal oil, wood or bituminous peat that are composed essentially of mixtures of long-chain, aliphatic and saturated hydrocarbons.

Particularly suitable are distillation products or hydrocarbon mixtures such as, for example, white mineral oil and/or other paraffin oils that contain mainly long-chain alkanes with preferably 13 to 20, more preferably 14 to 16 carbon atoms.

Hydrocarbons within the meaning of the invention are understood to be in the first instance branched or unbranched hydrocarbons that have 5 to 20, preferably 6 to 18, more preferably 8 to 12 carbon atoms. Most particularly preferred branched or unbranched alkanes with 8 to 12 carbon atoms are used, of which octane, nonane, decane and/or dodecane as well as mixtures thereof are especially preferred.

According to an alternative embodiment of the present invention one or more water-immiscible additives can be admixed with the contamination barrier of the invention. Additives within the meaning of the present invention are understood to be hydrophobic substances that contribute additionally to the reduction or respective prevention of aerosol formation. Particularly preferred herein is the addition of silicone oils of different compositions and viscosities. An important property of the silicone oils within this context is their inert behavior towards other substrates. Their considerable spreading ability is also characteristic and is associated with the expression of certain properties, for example hydrophobicity.

Silicone oils within the meaning of the invention are understood to be in the first instance synthetic oils based on semi-organic polymers and copolymers of silicon-oxygen units with organic side chains. These unbranched chains are constructed alternately of silicon and oxygen atoms, preferably have a chain length of 10 to 1000 silicon atoms, particularly preferred from 30 to 500 silicon atoms, most particularly preferred from 50 to 150 silicon atoms.

According to one advantageous embodiment of the present invention the contamination barrier of the invention (with and without additive) is used preferably for covering aqueous solutions in open and/or automatic systems with biological sample material. Biological sample material within the meaning of the present invention is understood to be biopolymers that on the one hand can be naturally occurring macromolecules, for example nucleic acids, proteins or polysaccharides, but on the other, also synthetically prepared polymers as long as these contain the same or similar building blocks as the natural macromolecules.

Surprisingly it has emerged that by covering aqueous solutions that preferably contain biological sample material with hydrocarbons of the aforementioned type, particularly in the form of the contamination barrier of the invention, especially in open, automated systems efficient and reproducible prevention of above all aerosol-related contamination occurs.

In the following the present invention will be illustrated more closely by means of attached drawings and practical examples.

Figure 3:
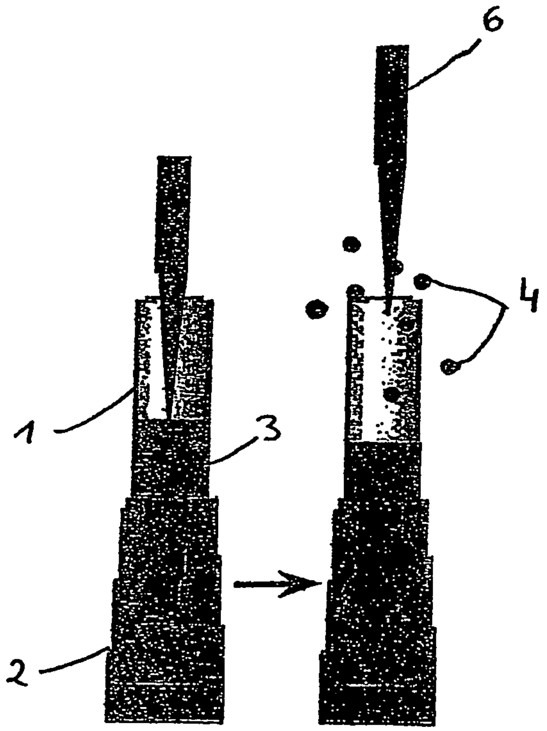
FIG. 3 a schematic pipetting procedure known from the state of the art from an open sample vessel during which a part of an aqueous solution is removed with aerosol formation.

It is clear from the state of the art illustrated in FIGS. 1 and 3 that aerosols 4 in a commercial reaction vessel 1 are formed on a pipette plate 2 (for example, a microtitration plate, etc.) by mechanical action on an aqueous solution 3 with biological sample material during pipetting procedures and/or mixing the sample etc., for example by means of a pipetting device 6 or similar.

Such an aerosol formation can readily lead to contamination of neighbouring vessels as soon as aerosol 4 flows from reaction vessel 1.

Figure 2:
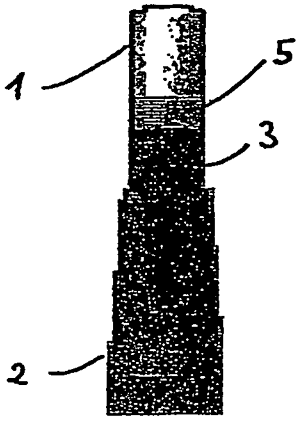
FIG. 2 a contamination barrier of the invention covering an aqueous solution in an open vessel.
Figure 4:
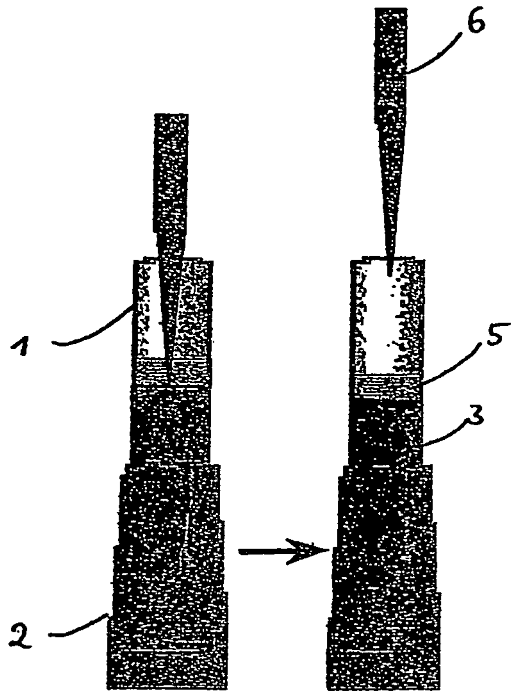
FIG. 4 a schematic pipetting procedure from an open sample vessel during which a part of an aqueous solution below a contamination barrier of the invention is taken without aerosol formation.
Figure 5:
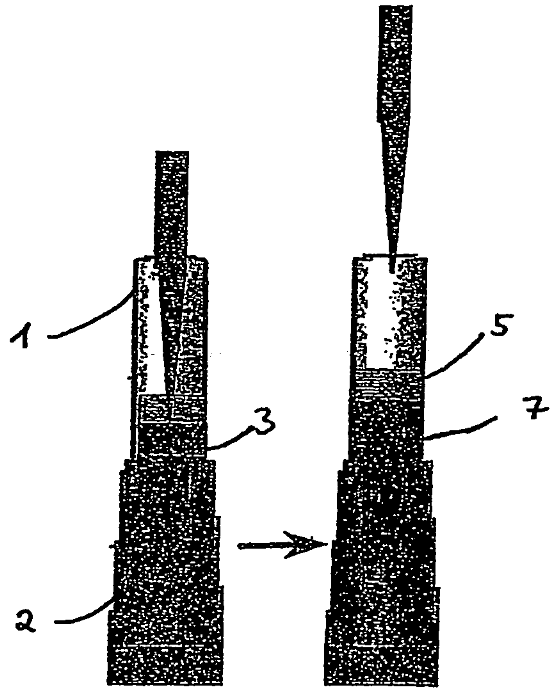
FIG. 5 a schematic pipetting procedure from an open sample vessel during which a further water-soluble fraction is added to an aqueous solution below a contamination barrier of the invention without aerosol formation.
Figure 6:
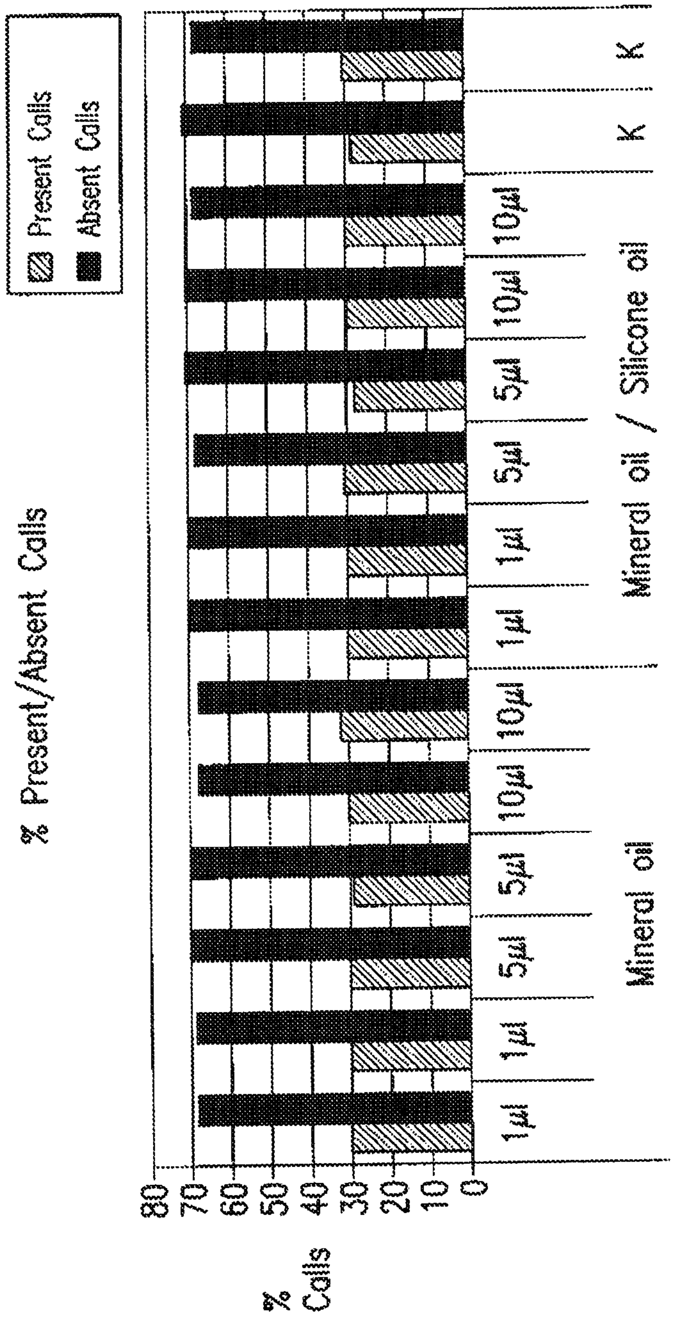
FIG. 6 an illustration of calls on the array.

By means of the contamination barrier 5 of the invention illustrated in FIGS. 2, 4 and 5 such a contaminating aerosol formation is prevented since the aqueous aerosol 4 cannot penetrate the contamination barrier 5. In reaction vessel 1 the water-immiscible contamination barrier 5 lies like a film on the aqueous solution 3 in which the biological sample material is located in a dissolved state.

During the pipetting procedure as shown in FIGS. 4 and 5 the aqueous solution 3 or sample in reaction vessel 1 is in each case processed under the contamination barrier 5. Owing to the water-immiscible composition of the contamination barrier 5 the formation of aerosols 4 is excluded both on dipping and withdrawal of the pipetting device 6 from the aqueous solution 3 and as well as on mixing.

Also during addition of a further aqueous solution to the sample as illustrated in FIG. 5 there is no aerosol formation of the aqueous mixture 7 on mixing the aqueous solution 3 already present with the additional solution owing to the contamination barrier 5 of the invention.

Since unlike the filters and/or septa fixed in the reaction vessel the contamination barrier 5 is very flexible, variable amounts of aqueous solution 3 can be removed from or added to the reaction vessel 1 at any time by means of a pipetting device 6 without a space being formed between the surface of the aqueous solution 3 and the contamination barrier 5 so that additionally the formation of aerosols 4 is avoided.

| Drawing reference list | |
|---|---|
| 1 | open reaction vessel |
| 2 | pipette plate |
| 3 | aqueous solution |
| 4 | aerosol molecules |

-continued

| Drawing reference list | |
|---|---|
| 5 | contaminations barrier |
| 6 | pipette device |
| 7 | aqueous mixture (from prepared and added sample solution) |

EXAMPLES

By means of the following experimental procedures important sources of contamination (KQ) of open, automated pipetting systems, especially in fully automatic high through-put work stations, so-called robotic systems (e.g. BioRobot Mdx/QIAGEN GmbH) will be illustrated and contamination (K) caused principally by aerosol formation, but also repeatedly by mechanical transfer of sample material, will be confirmed, and the clear reduction of such contamination by the use of the contamination barrier of the invention will be demonstrated.

For confirmation, cross-contamination test were carried out with samples containing biological sample material in the ppm range and lower as are used in current procedures in the area of PCR diagnostics. The experiments were based on a current method known from the state of the art for the isolation and purification of nucleic acids, especially viral RNA (protocol used: QIAamp 96 Virus Mdx V1.1/QIAGEN GmbH).

Equally, commercial kits that are especially suitable for use in robotic systems (e.g. QIAamp 96 Virus BioRobot Kit/QIAGEN GmbH), etc., were used as system components, reagents, consumables, etc.

For the experimental procedures with alkane assistance (Examples 1b and 2b) normal 96 deep well plates (hereinafter called S blocks) were prepared manually with 100 µl dodecane in each case.

Detection did not only take place by mere observations during the individual pipetting steps of the purification process, but also by additional determination of actual nucleic acid contamination in the negative samples in a subsequent down stream analysis (e.g. PCR, RT-PCR etc.). In addition to the important contamination sources of such systems, the following examples demonstrate clearly the effectiveness of the contamination barrier of the invention on the basis of the contamination rates (KR) determined.

Example 1

Cross-contamination tests, carried out a) with a sample volume of 285 µl without alkane presence, and b) with a sample volume of 285 µl with alkane presence.

The automated procedure was started with the identification of the samples, the so-called loadcheck. Hepatitis-C viral material (arHCV) with an average concentration of $10^8$-$10^9$ RNA copies/ml was used as sample material (PP), and negative plasma (e.g. citrate plasma/Breitscheid) as negative sample material (NP). After the loadcheck in each case 40 µl of a commercial protease (e.g. QIAGEN Protease/QIAGEN GmbH) was pipetted into the S block and the system was heated to 56° C.

As illustrated schematically in the following, the addition of in each case of 285 µl sample material was carried out in "checkerboard pattern". An NP(−) was pipetted alternately into the S block (KQ1!) next to each PP(+).

TABLE 1

Schematic representation of the loading of PP and NP in checkerboard pattern/S block

| | 1 | 2 | 3 | 4 | 5 | 6 | 7 | 8 | 9 | 10 | 11 | 12 |
|---|---|---|---|---|---|---|---|---|---|---|---|---|
| A | + | − | + | − | + | − | + | − | + | − | + | − |
| B | − | + | − | + | − | + | − | + | − | + | − | + |
| C | + | − | + | − | + | − | + | − | + | − | + | − |
| D | − | + | − | + | − | + | − | + | − | + | − | + |
| E | + | − | + | − | + | − | + | − | + | − | + | − |
| F | − | + | − | + | − | + | − | + | − | + | − | + |
| G | + | − | + | − | + | − | + | − | + | − | + | − |
| H | − | + | − | + | − | + | − | + | − | + | − | + |

Next 305 µl of a commercial lysis buffer (e.g. Lysis Buffer AL/QIAGEN GmbH) was added to the individual reaction solutions and these were then mixed by pipetting up and down (KQ2!) and then incubated for 10 minutes. Finally, at an interval of about one minute 2×360 µl ethanol (AR or min. 96%) was added in each case to each row of each reaction solution by pipette (KQ3!).

For separation or purification of the nucleic acids thus isolated in each case 910 µl of lysate were transferred automatically into the respective filter systems (e.g. QIAamp 96 plate/QIAGEN GmbH) (KQ4!) and filtered for 5 minutes under reduced pressure at 25° C. (KQ 5!). In accordance with the experimental protocol (see above) the filters loaded with the nucleic acid were then each washed under reduced pressure with 800 µl of a commercial wash buffer (e.g. Wash Buffer AW2/QIAGEN GmbH) (KQ 6!) and then in a second washing step with 930 µl ethanol (p.a. or min. 96%) (KQ 7!) and the membranes were dried under reduced pressure at 60° C. in an automated vacuum system (e.g. RoboVac/QIAGEN GmbH) (KQ 8!) to remove the ethanol.

The purified nucleic acid was then eluted from the filter system under reduced pressure for one minute, once with 50 µl and once with 100 µl of at least one commercially available elution buffer (e.g. Elution Buffer AVE/QIAGEN GmbH) (KQ 9!). The collected eluate was prepared for the following amplification process external to the automated pipetting system. A commercial enzyme mixture (e.g. Mastermix/QIAGEN GmbH) was pipetted into the eluate prepared for the PT-PCR (KQ10!), a RT-PCR was carried out to determine the nucleic acid contamination and the results were evaluated.

Two experimental runs (Run 1al and 1all) without the presence of dodecane were carried out with the following ar HCV dilution:

$$1\times10^{11}\text{ IU/ml}+148.5\text{ ml }NP=1\times10^{9}\text{ IU/ml}$$

Up to the addition of the elution buffer neither in Run 1al nor in Run 1all were any observations made that could have been attributed to contamination, especially at the contamination sources (KQ) 1-4.

Only during the elution (KQ7) were observations made in this respect. Thus, for example, clear bubble formation was observed during the addition of the elution buffer, especially in Row 12. In part the bubbles burst on insertion and removal of the pipette tips.

At the NP position B, D, F in Row 1 (both in Run 1al and also in Run H) the outlet openings of the filter system (nozzles) were just as yellow after elution as those of the PP.

After undertaking the RT-PCR the following rates of cross-contamination was found:

Run 1aI: 9 K/48 NP⇒ $KR_{Run\ 1aI}$=18.75%

Run 1aII: 2 K/48 NP⇒ $KR_{Run\ 1aII}$=4.17%

This gives an average rate of contamination (KR) of 11.46%.

The three experimental runs (Runs 1bI, 1bII and 1bIII) in the presence of dodecane were also carried out with the aforementioned ar HCV dilution:

$$1\times10^{11}\ \text{IU/ml}+148.5\ \text{ml}\ NP=1\times10^{9}\ \text{IU/ml}$$

Run 1blll was added on after in Run 1bll row B could not be co-evaluated owing to missing PP addition. During the experimental procedure no particular occurrences were observed, however, that were indicative of the transference of sample material during pipetting procedures or aerosol formation.

After carrying out the RT-PCR the following rates of cross-contamination were determined Run 1bI: 1 K/42NP⇒ $KR_{Run}$ 1bI=2.38%

Run 1bII: 3 K/48 NP⇒ $KR_{Run}$ 1bII=6.25%

Run 1bIII: 3 K/48 NP⇒ $KR_{Run}$ 1bII=6.25%

This gives an average rate of contamination (KR) of 4.96%.

After comparison of the contamination rates thus determined it was possible to demonstrate that through the use of dodecane, the rate of cross-contaminate for the whole of the isolation and separation procedure can be reduced by more than half (factor of 2.3).

Example 2

Cross-contamination tests, carried out a) with a sample volume of 570 μl without alkane presence, and b) with a sample volume of von 570 μl with alkane presence.

The automated procedure was started with the identification of samples, the so-called loadcheck. Hepatitis-C viral material (arHCV) with an average concentration of $10^{8}$-$10^{9}$ RNA copies/ml was used as positive sample material (PP) and negative plasma (e.g. citrate plasma/Breitscheid) as negative sample material (NP). After the loadcheck in each case 80 μl of a commercial protease (e.g. QIAGEN Protease/QIAGEN GmbH) was pipetted into the S block and the system was heated to 56° C.

The addition of in each case 570 μl sample material was carried out as previously illustrated schematically in Table 1. in the "chessboard pattern". An NP(−) was pipetted into the S block (KQ1!) next to each PP(+).

Next 610 μl of a commercial lysis buffer (e.g. Lysis Buffer AL/QIAGEN GmbH) was added to the individual reaction solutions and these were then mixed by pipetting up and down (KQ2!) and then incubated for 10 minutes. Finally at an interval of about one minute 2×720 μl ethanol (AR or min. 96%) was added in each case to each row of each reaction solution by pipette (KQ3!).

For separation or purification of the nucleic acids thus isolated were in each case 910 μl lysate were transferred automatically to the respective filter systems (e.g. QIAamp 96 plate/QIAGEN GmbH) (KQ4!) and filtered for 5 minutes under reduced pressure at 25° C. (KQ 5!).

In accordance with the experimental protocol (see above) the filters were loaded with the nucleic acid were then each washed under reduced pressure with 800 μl of a commercial wash buffer (e.g. Wash Buffer AW2/QIAGEN GmbH) (KQ 6!) and then in a second washing step with 930 μl ethanol (AR or min. 96%) (KQ 7!) and the membranes were dried under reduced pressure at 60° C. in an automatic vacuum device (e.g. RoboVac/QIAGEN GmbH) (KQ 8!) to remove the ethanol.

The purified nucleic acid was then eluted from the filter system under reduced pressure for one minute once with 50 μl and once with 100 μl of at least one commercially available elution buffer (e.g. Elution Buffer AVE/QIAGEN GmbH) (KQ 9!). The collected eluate was prepared for the following amplification process external to the automated pipetting system. A commercial enzyme mixture (e.g. Mastermix/QIAGEN GmbH) was pipetted into the eluate prepared for the RT-PCR (KQ10!), a RT-PCR was carried out to determine the nucleic acid contamination and the results were evaluated.

The two experimental runs (Run 2al and 2all) without the presence of dodecane were carried out with the following ar HCV dilution:

$$15\ \text{ml}\ 1\times10^{9}\ \text{IU/ml}+22.5\ \text{ml}\ NP=4\times10^{8}\ \text{IU/ml}$$

Even during the addition of the lysis buffer to the S block the bubbles rose to the upper edge of the individual reaction vessels. In addition the pipette tips withdrew again so rapidly from the reaction vessels that to a certain extent the bubbles formed burst (especially in Positions H5 and H10). During the second addition of the lysis buffer also, bubbles formed increasingly during mixing in the S block that were either carried up on removal of the tip and/or burst.

During addition of the elution buffer too observations in respect of contamination were made both in Run 2al and Run 2all. Thus, for example, bubble formation was to be clearly seen during and after addition of the elution buffer, especially in Row G and in Position H6. Here too the bubbles partially burst on immersing and/or withdrawing the tips. In Row 1 at the NP positions B, D, F and H the nozzles under the QIA plate were just as yellow after elution as those of the PP.

After carrying out the RT-PCR the following cross-contamination was found:

Run 2aI: 31 K/48 NP⇒ $KR_{Run}$ 2aI=64.58%

Run 2aII: 34 K/48 NP⇒ $KR_{Run}$ 2aII=70.08%

This gives an average rate of contamination (KR) of 67.33%.

At this point it is clearly demonstrated that on increasing sample volumes, the pipetting step is considerably more susceptible to cross-contamination since here the S block volumes are completely exploited.

The two experimental runs (Run 2bl and 2bll) in the presence of dodecane were also carried out with the aforementioned ar HCV dilution:

$$15\ \text{ml}\ 1\times10^{9}\ \text{IU/ml}+22.5\ \text{ml}\ NP=4\times10^{8}\ \text{IU/ml}$$

In order to be able better to observe the action of dodecane covering in respect of a reduction or prevention of bubble formation, etc., the dodecane used was previously coloured with Sudan black.

During the whole of the experimental procedure, however, no special occurrences were observed in respect of contamination. The nozzles at the QIA plate also exhibited no residues or colourations after elution as in Example 1b.

After carrying out the RT-PCR the following rates of cross-contamination were found:

Run 2bI: 6 K/48 NP⇒ $KR_{Run}$ 2bI=12.50%

Run 2bI: 10 K/48 NP⇒ $KR_{Run}$ 2bII=20.83%

This gives an average rate of contamination (KR) of 16.67%

By comparison of the rates of contamination thus determined it was possible to demonstrate that through the use of dodecane, the cross-contaminate rate for the whole of the isolation and separation procedure at high sample and reaction volumes can be reduced by at least a factor of 4.

As already discussed previously, such a total process exhibits a number of error and contamination sources. In order to determine the effect of the contamination barrier of the invention for an individual pipetting step, single samples (preferably NP) were taken during the course of the experimental series and analysed by means of RT-PCR. Starting from the observations made in Examples 1b and 2b that by covering with dodecane the formation of bubbles and, respectively, aerosols caused by immersing and withdrawing the pipette tips are averted, especially during the initial process steps (in the region of the contamination sources 1 to 4), samples were taken at these locations of the total procedure and analysed. None of these samples exhibited nucleic acid contamination. Thus for individual process steps (cross-)contamination can even be totally prevented by the use of dodecane.

Further experiments showed that good success in the prevention of (cross-)contamination can be achieved by the use of dodecane also in the pipetting steps of downstream analyses (such as, for example, RT-PCR). Thus, for example, in further cross-contamination tests commercial enzyme mixture required for an RT-PCR (e.g. Mastenmix/QIAGEN GmbH) was added to a sample covered with dodecane. Here too the negative samples in the experimental series with the contamination barrier of the invention exhibited significantly less contamination, or even none.

Thus covering with the contamination barrier of the invention is not only suitable for any type of pipetting procedure. According to another embodiment of the present invention the contamination barrier of the invention can also be used in other modules of sample processing in which (cross-)contamination occurs. Thus, the use of the contamination barrier of the invention inhibits in an equally advantageous manner cross-contamination which arise, for example, through aerosol formation, the addition of washing buffers, dosing with a dispenser, by the introduction of stirring or mixing devices (such as, for example, magnetic stirring bars, stirring rod, plunger mixer, piston mixer, etc., wherein stirring is understood to be a rotational movement, mixing an upward and downward movement).

In addition the contamination barrier used can have a positive effect in other applications. This, for example, the use of the contamination barrier of the invention in array experiments as illustrated in the following leads to a stabilisation of such applications in addition to the avoidance of contamination.

Example 3

On the basis of the special properties of the additives of the invention mixtures of mineral and silicone oils were selected in addition to mineral oils for covering reaction batches in array experiments.

The use of the contamination barrier of the invention was carried out in this case during the preparation of biotin labelled cRNA for hybridisation on microarrays (e.g. Human Genome U133B Array/Affymetrix, US), where different volumes of the contamination barrier was added to cRNA fragmentation batches. Different amounts of mineral oil or a mixture of mineral oil and silicone oil were used as contamination barrier.

The synthesis of the hybridisation samples was carried out in accordance with the manufacturer's protocol (Affymetrix). After the synthesis of cRNA from 2 μg Hela S3 total RNA 1 μl, 5 μl and 10 μl of the oils was added to different fragmentation batches. Hybridisation batches were transferred to the hybridisation array. Hybridisation and analysis of the GeneChip arrays was undertaken in accordance with the information from the manufacturer. Samples (K) which were also processed in accordance with the standard manufacturer protocol for sample processing, but without contamination barrier were used, as controls.

Next, data on detectable, statistically relevant signals (present calls) and non-detectable signals on the array were obtained for this experimental series (for background on the arrays used). In this way the variations in the measurement values should be small and independent of the addition of the oils. The data lifted were illustrated as follows on a bar chart.

The results show that uniform hybridisation results were obtained with addition of the contamination barrier (with and without additive). The variations in calls was ±2%, which corresponds to the variation for technical replicates given by the Chip manufacturer.

Since, moreover, prevention of cross-contamination in the automated preparation of samples for hybridisation on microarrays is also advantageous and desirable, in further experiments the action of the contamination of the invention on an automated system (BioRobot 8000/QIAGEN GmbH) where transfer of parts of the contamination barrier can occur during the processing steps or sample preparation was checked. RNeasy 96 chemistry (QIAGEN GmbH) was used for the automated preparation of RNA from cell culture cells. 5 μg total RNA from Hela cells was bound to the column matrix of the RNeasy plates (n=4). After three washing steps the purified RNA was washed from the column with water. To avoid cross-contamination during elution and to improve the yield the samples were previously covered with mineral oil or a mixture of mineral oil and silicone oil. In order to check whether possibly the additive alone would also be suitable for this application one experimental batch was covered only with silicone oil. The RNA yield was subsequently measured photometrically.

The covering of the samples with a contamination barrier of the invention to which silicone oil was added as additive also led to higher yields in an automated system than comparable experiments without the contamination barrier of the invention. Surprisingly the yields could be increased by up to 10% with the use of the additives of the invention, which represents a further improvement of the contamination barrier of the invention.

Further experimental series also demonstrated that in addition to the aforementioned mineral oil/silicone oil mixtures, silicone oils alone or in the form of additive mixtures can function as contamination barrier of the invention in hybridisation experiments (commercial silicone oils such as AK 35, AK 50 and AK 100 of Wacker Chemie GmbH were tested).

What is claimed is:

1. A method for reducing contamination during the processing of aqueous solutions in an automated system comprising a robotic or automated pipetting system, the method comprising:

a) providing a plurality of open sample vessels, the sample vessels comprising an aqueous solution;

b) covering said aqueous solutions with a contamination barrier comprising at least one water immiscible hydrocarbon or hydrocarbon mixture to completely form a film on the aqueous solutions, wherein the at least one water immiscible hydrocarbon or hydrocarbon mixture comprises branched or unbranched alkanes of from 8 to 12 carbon atoms;

c) pipetting and processing the aqueous solutions under the contamination barrier by penetrating the contamination barrier with the robotic or automated pipetting system; and d) obtaining a plurality of processed aqueous solutions with reduced cross-contamination between the aqueous solutions as compared to processed aqueous solutions that do not have the contamination barrier present, wherein said cross-contamination is reduced by at least a factor of two.

2. The method of claim 1, wherein said alkane is comprised of one or more cyclic alkanes.

3. The method of claim 1, wherein said alkane is comprised of one or more acyclic alkanes.

4. The method of claim 1, wherein said alkane is selected from the group consisting of octane, nonane, decane and dodecane and mixtures thereof.

5. A method for reducing contamination during the processing of aqueous solutions in an automated system comprising a robotic or automated pipetting system, the method comprising:

providing a plurality of open sample vessels, the sample vessels comprising an aqueous solution;

b) covering said aqueous solutions with a contamination barrier comprising silicone oil to completely form a film on the aqueous solutions;

c) pipetting and processing the aqueous solutions under the contamination barrier by penetrating the contamination barrier with the robotic or automated pipetting system; and d) obtaining a plurality of processed aqueous solutions with reduced cross-contamination between the aqueous solutions as compared to processed aqueous solutions that do not have the contamination barrier present, wherein said cross-contamination is reduced by at least a factor of two.

6. The method of claim 5, wherein said silicone oil comprises unbranched chains of silicon and oxygen atoms having a chain length of 10 to 1000 silicon atoms.

7. The method of claim 6, wherein said silicone oil comprises unbranched chains of silicon and oxygen atoms having a chain length of 30 to 500 silicon atoms.

8. The method of claim 7, wherein said silicone oil comprises unbranched chains of silicon and oxygen atoms having a chain length of 50 to 150 silicon atoms.

9. The method of claim 6, wherein said contamination barrier consists of silicone oil.

* * * * *